United States Patent Office 3,306,561
Patented Feb. 28, 1967

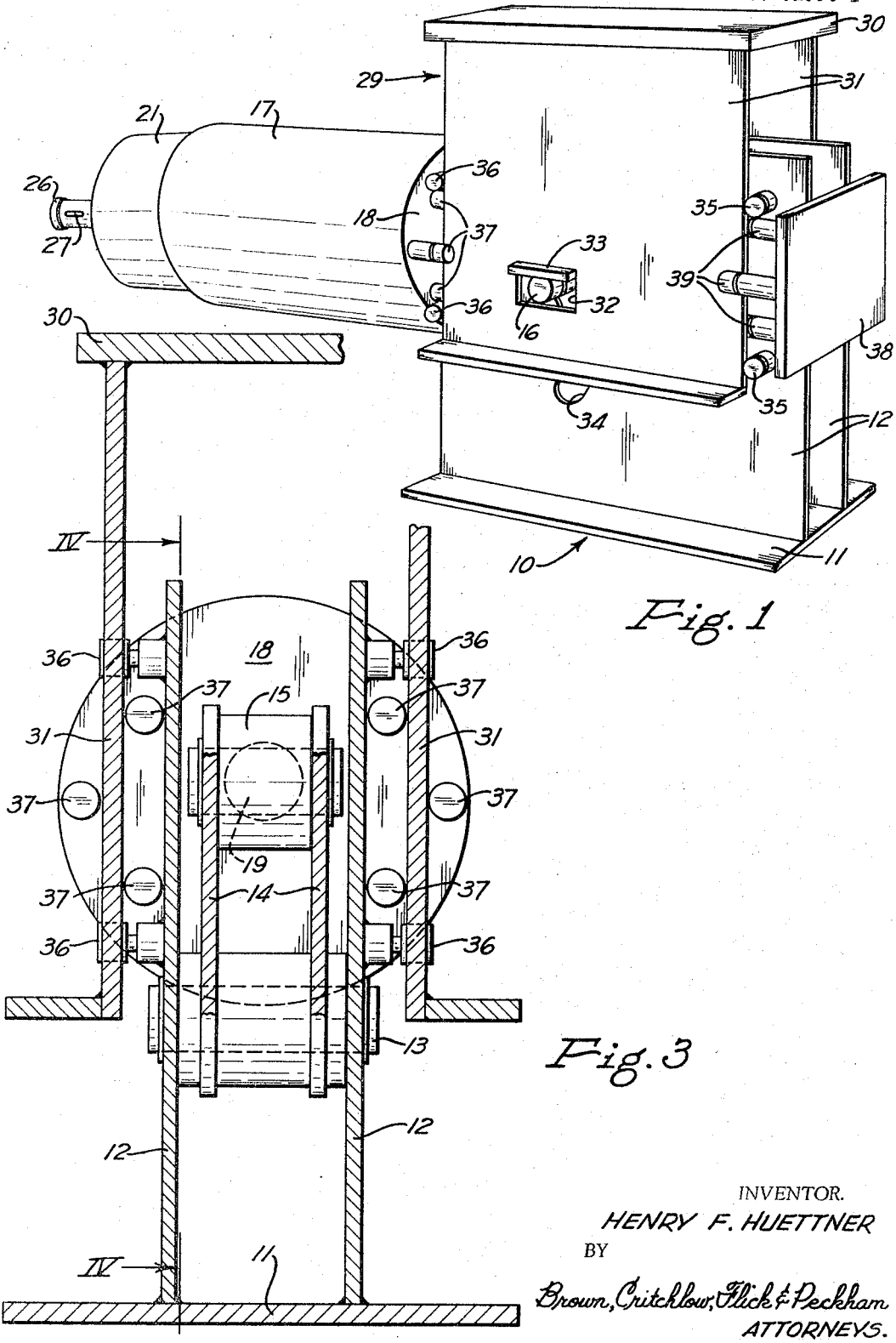

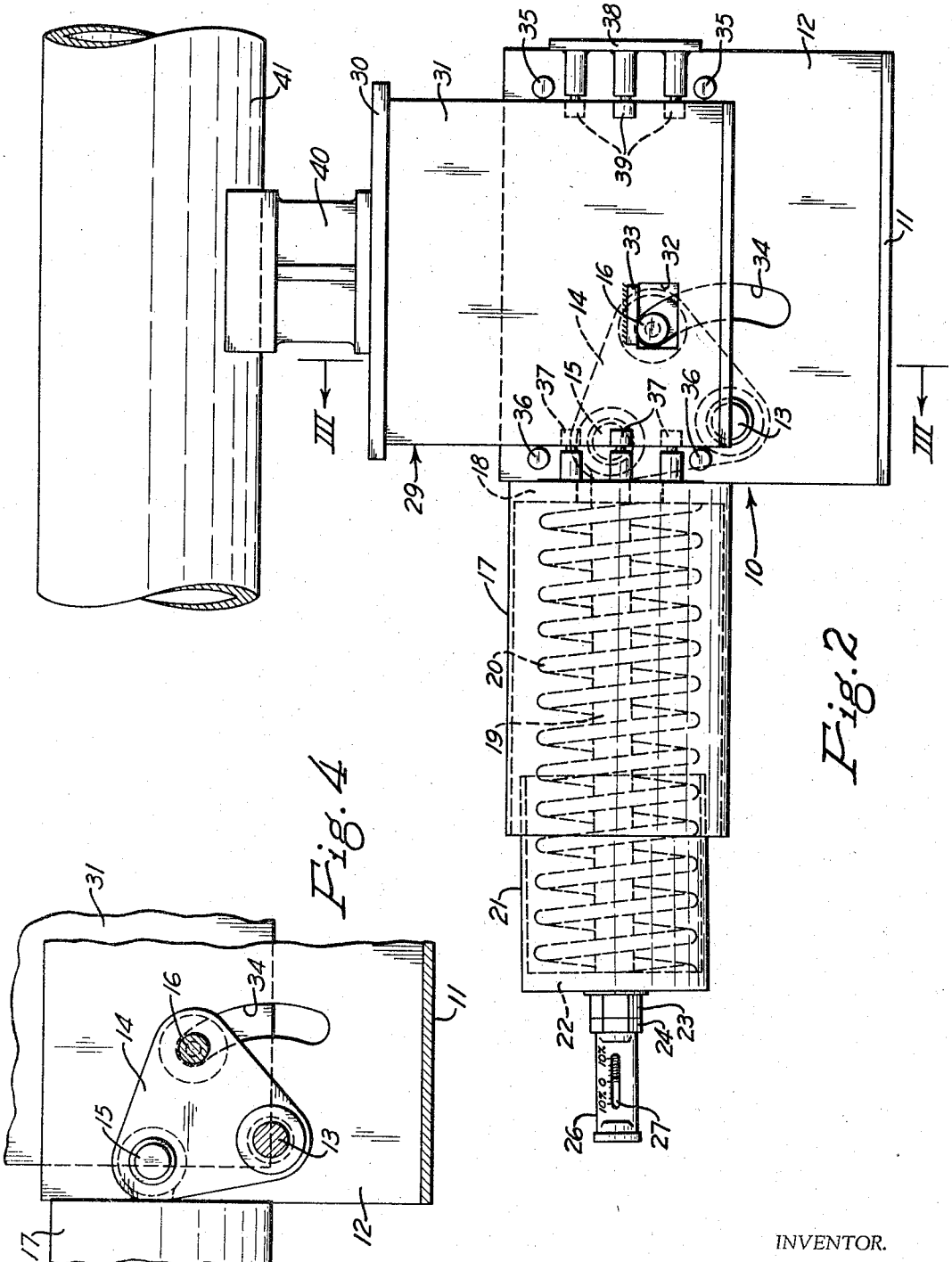

3,306,561
UPTHRUST PIPE SUPPORT
Henry F. Huettner, Pittsburgh, Pa., assignor to National Valve and Manufacturing Company, a corporation of Delaware
Filed Apr. 27, 1965, Ser. No. 451,222
6 Claims. (Cl. 248—54)

This invention relates to a hanger which will provide constant support for a load of constant weight, regardless of vertical movement of the load. The invention may be applied wherever a load of constant weight is subjected to a limited range of movement, and must be given constant support during that limited movement.

The invention is particularly useful for supporting the heavy pipe lines used to conduct steam in power plants. Due to the high temperatures and pressures used for the steam, these pipes must have thick walls and are very heavy. The large variation between room temperature and operating temperature causes considerable expansion and contraction of the lines, and hence considerable movement of the lines relative to the supporting structures. The hanger of the present invention provides constant support for such lines without interfering with movement of the piping due to temperature changes.

The present invention provides a hanger of the general type shown in U.S. Patent 2,946,547 to C. G. Grabe, but in which the load is supported from below, i.e., the hanger pushes up on the load rather than carrying the load from above as in the Grabe patent.

In the present invention the support for the load is provided by a counterbalancing spring acting through a bellcrank. The bellcrank and spring are disposed as in the Grabe patent so that as the load moves one arm of the bellcrank, the other arm of the bellcrank compresses the spring, and the changing angle of the bellcrank increases the mechanical advantage of the leverage system to offset the increased resistance of the spring. In this way a practically constant support is provided for the load.

In the present invention the arm of the bellcrank which carries the load is in contact with a vertically-movable saddle which straddles the bellcrank. The saddle carries the load and transmits it directly to the load arm of the bellcrank.

The pipe, or other load, rests freely on top of the saddle. This simplified mounting permits free longitudinal expansion or contraction of the pipe without in any way affecting the operation of the hanger.

The use of this saddle for supporting the load provides an efficient and compact upthrust hanger that can be utilized where space is limited and it is necessary to support the pipe from below.

These and other objects and advantages of the invention will become apparent as the description proceeds.

In the drawings:

FIG. 1 is a perspective view of a hanger embodying the invention;

FIG. 2 is a side elevation showing certain of the parts in phantom;

FIG. 3 is a section on line III—III of FIG. 2; and

FIG. 4 is a partial section showing in greater detail the pivot arrangements of FIG. 2.

Referring to the drawings in greater detail, the invention includes a support member 10 composed of a bottom plate 11 and two parallel upstanding support plates 12. A horizontal bellcrank support pivot pin 13 extends between the support plates 12 and has its outer ends secured in the plates. The bellcrank member includes a pair of parallel plates 14 (seen especially FIG. 3) which are pivotally mounted on the support pivot pin 13. The upwardly extending portion of the bellcrank plates 14 carries a pivot pin 15 which may be called the balance-arm pivot. In the operation of the device the portion of the bellcrank plates which lies between the support pivot pin 13 and the balance-arm pivot 15 may be considered the balance arm of the bellcrank.

The portion of the bellcrank plates 14 which projects toward the right as viewed in FIG. 2 is provided with a pivot pin 16 which may be considered as the load pivot. The portion of the bellcrank plates lying between the support pivot 13 and the load pivot 16 may be considered the load arm of the bellcrank.

Thus, it will be seen that the balance arm and the load arm of the bellcrank are in fixed angular relation to each other.

A spring barrel 17 has its base 18 welded or otherwise secured to the ends of support plates 12 which are at the left side as viewed in FIG. 2. A spring rod 19 extends through the spring barrel 17 and has its inner end pivotally attached to the spring arm pivot pin 15. A support spring 20 is placed within the spring barrel 17 and surrounding the spring rod 19. The inner end of the spring 20 engages the base 18 which thus forms a spring seat.

The outer end of the support spring 20 is retained by a cap 21 which has its bottom plate 22 adjustably mounted on the outer end of the spring rod 19. Locking nuts 23 and 24 are provided for holding the cap 21 in place and for adjusting the tension on support spring 20. A housing 26 attached to lock nut 24 is provided with a window 27 through which the end of the spring rod 19 can be observed in order to provide for field adjustment of the spring.

In this arrangement the spring seat 18 is spaced laterally from the bellcrank support pivot 13 and is provided with an enlarged opening which permits vertical movement of the spring rod relative to the spring seat.

A saddle 29 straddles the support plates 12 as clearly shown in FIGS. 1 and 3. This saddle 29 includes a horizontal top load plate 30 and side plates 31.

Each of the side plates 31 is provided with an opening 32 through which the load pivot 16 projects. The upper side of each opening 32 is provided with a horizontal bearing block 33 which is welded to the support plate 12. The opposite ends of the load pivot 16 carry roller bearings that engage the bearing blocks 33.

It will be understood from the above construction that downward pressure on the top plate 30 of saddle 29 will press the bearing blocks 33 down against the outer ends of load pivot 16, thereby pressing load pivot 16 downwardly. This downward movement of load pivot 16 (see FIG. 2) will cause the spring arm pivot 15 of the bellcrank to move toward the right as seen in FIG. 2, thereby compressing the support spring 20. This compression of the spring 20 increases the resistance of the spring, but the parts are so constructed and arranged that this increased spring resistance is exactly equalled by the increased mechanical advantage of the bellcrank, as fully explained in Grabe Patent 2,946,547. In this way the bellcrank and spring arrangement provides a constant support for the pipe as it moves up and down due to changing thermal conditions in vertical runs of the piping.

In assembling the hanger the spring 20 is pre-compressed to the extent explained in detail in Grabe Patent 2,946,547 in order to provide constant support for the load regardless of vertical movements of the load.

In order to permit the load pivot pin 16 to engage the bearing blocks 33 carried by the side plates 31 of the saddle, it is necessary for pivot pin 16 to extend through openings 34 in the support plates 12. As shown in FIG. 2 these openings are in the form of arcuate slots which correspond in curvature with the arcuate path of movement of the load pivot 16 when the hanger is in opera- In order to steady and guide the vertical movement of the saddle 29, rollers are provided which engage the side plates 31 on their edges as well as on their flat faces.

A pair of rollers 35 is mounted on each support plate so as to engage the right-hand edge of each plate 31 as seen in FIGS. 1 and 2, and a similar pair of rollers 36 is mounted to engage the left-hand edges of plates 31. The rollers 35 and 36 prevent lateral twisting in the plane of the side plates 31.

Rollers are also provided which engage each of the flat faces of the side plates 31 of the saddle. These rollers 37 on the side of the saddle toward the spring barrel 17 are mounted directly on the base plate 18 of the spring barrel. It will be clear from FIG. 3 that a pair of these rollers 37 engages the inner face of each of the side plates 31 while a single roller 37 engages the outer surface of the plate 31. The roller 37 on the outer side of plate 31 is placed at a location intermediate the rollers 37 on the inner side of plate 31.

On the end of the base member 10 remote from the spring barrel 17 a reinforcing plate 38 is welded to the edges of the support plates 12. This reinforcing plate 38 is provided with a set of rollers 39, which engage the inner and outer faces of the side plates 31 in a manner similar to that just explained in connection with the rollers 37.

It will be understood that the rollers 35, 36, 37, and 39 can be any suitable form of antifriction roller mounted on studs which are welded to the parts which support the rollers.

It will be clear that these rollers 35, 36, 37, and 39 guide the saddle 29 for smooth vertical movement while holding it in proper alinement.

The pipe or other member to be supported may rest directly on the top plate 30 of the saddle or, as illustrated in FIG. 2, a supplementary support member 40 may be interposed between the pipe 41 and the saddle. In either case, the pipe is not rigidly connected to the supporting structure but is free to move along its longitudinal axis under the influence of any forces such as thermal expansion and contraction which tend to move it along this axis.

It will be clear from the above description that the present invention provides a simple and efficient upthrust pipe hanger that provides a constant support for the load.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. In a hanger of known type having
   a support;
   a spring seat rigidly mounted on said support;
   a bellcrank mounted on the support by a horizontal pivot pin spaced from said spring seat; the bellcrank having angularly-related load and balance arms, the load arm carrying a load pivot;
   a longitudinally extending spring having one end seated on said spring seat;
   and a spring rod extending longitudinally of said spring, the outer end of the spring rod being connected to the outer end of the spring, and the inner end of the spring rod being pivotally attached to the balance arm of the bellcrank to form a balance pivot;
   said spring being initially compressed a predetermined amount measured partly by the angle between the load and balance arms of the bellcrank;
the improvement which comprises:
   a load saddle which extends above and around the bellcrank;
   the saddle having a top horizontal load plate adapted to directly engage and carry the load by gravity contact only and side plates; each of the side plates carrying a bearing block which engages the load pivot of the bellcrank.
2. A device as claimed in claim 1 in which the saddle is U-shaped in cross section.
3. A device as claimed in claim 2 in which rollers are mounted to guide the side plates of the load saddle so that they can move only in the vertical direction.
4. A device as claimed in claim 1 in which the support comprises a bottom plate and two upstanding support plates;
   the outer ends of the horizontal pivot pin of the bellcrank being mounted in the upstanding support plates;
   and each upstanding support plate being formed with an arcuate slot through which the load pivot pin of the bellcrank projects to engage the bearing blocks carried by the load saddle.
5. A device as claimed in claim 4 in which rollers are mounted to engage and guide the side plates of the load saddle so that they can move only in the vertical direction.
6. A device as claimed in claim 1 in which the support comprises a bottom plate and two parallel upstanding support plates;
   the spring seat being integrally attached to the edges of the upstanding support plates at one end of the support;
   a reinforcing plate integrally attached to the edges of the upstanding support plates at the other end of the support;
   each of the side plates of the saddle being engaged on its inner and outer faces by rollers mounted on the spring seat and on the reinforcing plate;
   and each of the side plates of the saddle being engaged on its opposite end edges by rollers mounted on the upstanding support plates.

References Cited by the Examiner
UNITED STATES PATENTS

| | | | |
|---|---|---|---|
| 1,937,135 | 11/1933 | Wood | 248—54 |
| 2,903,213 | 9/1959 | Suozzo | 248—54 |
| 2,946,547 | 7/1960 | Grabe | 248—54 |
| 3,148,852 | 9/1964 | Lord et al. | 248—54 |

CLAUDE A. LE ROY, *Primary Examiner.*

R. P. SEITTER, *Assistant Examiner.*